(12) United States Patent
Eri et al.

(10) Patent No.: US 11,535,757 B2
(45) Date of Patent: Dec. 27, 2022

(54) ORGANIC SUBSTANCE-ATTACHED POROUS INORGANIC OXIDE PARTICLE

(71) Applicant: FUJIFILM Business Innovation Corp., Tokyo (JP)

(72) Inventors: Yoshifumi Eri, Kanagawa (JP); Takahiro Mizuguchi, Kanagawa (JP); Sakae Takeuchi, Kanagawa (JP); Yuka Zenitani, Kanagawa (JP); Koji Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 273 days.

(21) Appl. No.: 16/903,385

(22) Filed: Jun. 17, 2020

(65) Prior Publication Data

US 2021/0163754 A1 Jun. 3, 2021

(30) Foreign Application Priority Data

Nov. 29, 2019 (JP) .............................. JP2019-216812

(51) Int. Cl.
  *C09C 1/30* (2006.01)

(52) U.S. Cl.
  CPC ........ *C09C 1/3081* (2013.01); *C01P 2004/64* (2013.01); *C01P 2006/22* (2013.01)

(58) Field of Classification Search
  CPC ....... C09C 1/3081; C09C 3/12; C01P 2004/64
  See application file for complete search history.

(56) References Cited

FOREIGN PATENT DOCUMENTS

| JP | 2012-236752 | 12/2012 |
|----|-------------|---------|
| JP | 2014-162681 | 9/2014  |

*Primary Examiner* — Alexandre F Ferre
(74) *Attorney, Agent, or Firm* — JCIPRNET

(57) ABSTRACT

An organic substance-attached porous inorganic oxide particle including porous inorganic oxide particle and an organic substance attached to the surface of the porous inorganic oxide particle. The organic substance-attached porous inorganic oxide particle satisfies a formula below $$(Cf-Ce)/2>1$$

where Cf represents the amount of carbon (atom %) measured by subjecting the surface of the particle to X-ray photoelectron spectroscopy (XPS) after the particle is washed, and Ce represents the amount of carbon (atom %) measured by subjecting the surface of the particle to X-ray photoelectron spectroscopy (XPS) after two-minute surface etching of the particle.

9 Claims, No Drawings

ORGANIC SUBSTANCE-ATTACHED POROUS INORGANIC OXIDE PARTICLE

CROSS-REFERENCE TO RELATED APPLICATIONS

This application is based on and claims priority under 35 USC 119 from Japanese Patent Application No. 2019-216812 filed Nov. 29, 2019.

BACKGROUND

(i) Technical Field

The present disclosure relates to an organic substance-attached porous inorganic oxide particle.

(ii) Related Art

Porous oxide particles, such as silica particles, titania particles, and alumina particles, are used as an additive constituent or main constituent of, for example, toner, cosmetics, rubber, and abrasives.

Japanese Unexamined Patent Application Publication No. 2014-162681 proposes a surface-treated silica powder. The silica powder is obtained by surface-treating raw silica powder with unreactive silicone oil. When the amount of carbon (mass %) contained in the surface-treated silica powder is denoted as C and the specific surface area ($m^2/g$) of the raw silica powder is denoted as S, the amount of carbon per $m^2$ of the surface-treated silica powder (C/S) is 0.02 or less. The surface-treated silica powder has a hydrophobicity of 85% or higher.

Japanese Unexamined Patent Application Publication No. 2012-236752 proposes hydrophobic fine silica particles treated to be hydrophobic with silicone oil. The amount of carbon that remains on the surface of the particles is 5.0 to 10 wt %. The hydrophobic fine silica particles have an average primary particle diameter of 7 to 25 nm, a hydrophobicity of 95% or higher, and an amount of free carbon of 1.0 to 3.0 wt %.

SUMMARY

Aspects of non-limiting embodiments of the present disclosure relate to an organic substance-attached porous inorganic oxide particle including a porous inorganic oxide particle and an organic substance attached to the surface of the porous inorganic oxide particle. The organic substance-attached porous inorganic particle has more excellent sustainability of the function of the organic substance than an organic substance-attached porous inorganic oxide particle that satisfies $(C_f-C_e)/2 \leq 1$, where $C_f$ represents the amount of carbon (atom %) measured by subjecting the surface of the particle to X-ray photoelectron spectroscopy (XPS) after the particle is washed, and $C_e$ represents the amount of carbon (atom %) measured by subjecting the surface of the particle to X-ray photoelectron spectroscopy (XPS) after two-minute surface etching of the particle.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an organic substance-attached porous inorganic oxide particle including a porous inorganic oxide particle and an organic substance attached to the surface of the porous inorganic oxide particle. The organic substance-attached porous inorganic oxide particle satisfies a formula below $$(C_f-C_e)/2 > 1$$

where $C_f$ represents the amount of carbon (atom %) measured by subjecting the surface of the particle to X-ray photoelectron spectroscopy (XPS) after the particle is washed, and $C_e$ represents the amount of carbon (atom %) measured by subjecting the surface of the particle to X-ray photoelectron spectroscopy (XPS) after two-minute surface etching of the particle.

DETAILED DESCRIPTION

Hereinafter, an exemplary embodiment of the present disclosure will be described. Such explanation and examples are for description of the exemplary embodiments and do not limit the scope of the exemplary embodiment.

When numerical ranges are described stepwise in the present specification, the upper limit or lower limit values of a numerical range may be replaced with the upper limit or lower limit values of another stepwise numerical range. The upper limit or lower limit values of a numerical range in the present specification may be replaced with a value in examples.

The word "step" in the present specification refers not only to an independent step, but also to a step that is not clearly separable from another step, provided that a predetermined object of the step is achieved.

Each component may contain plural types of substances corresponding to the component.

In the present disclosure, when a composition contains plural types of substances corresponding to a component of the composition, the amount of component in the composition refers to the total amount of plural types of the substances in the composition, unless stated otherwise.

Organic Substance-Attached Porous Inorganic Oxide Particle

An organic substance-attached porous inorganic oxide particle according to the present exemplary embodiment (hereinafter, also referred to as "organic substance-attached particle") includes a porous inorganic oxide particle and an organic substance attached to the surface of the porous inorganic oxide particle.

The organic substance-attached particle according to the present exemplary embodiment satisfies $(C_f-C_e)/2 > 1$, $C_f$ being the amount of carbon (atom %) measured by subjecting the surface of the particle to X-ray photoelectron spectroscopy (XPS) after the particle is washed, $C_e$ being the amount of carbon (atom %) measured by subjecting the surface of the particle to X-ray photoelectron spectroscopy (XPS) after two-minute surface etching of the particle.

It is known that to improve functions, such as flowability, a porous inorganic oxide particle is surface-treated to have an organic substance, such as oil, attached to the particle.

Such an organic substance on the porous inorganic oxide particle transfers over time, for example. Thus, the amount of organic substance on the surface of the particle decreases, and the function conferred by the organic substance decreases. Specifically, in a case where oil as the organic substance is attached to the surface of the porous inorganic oxide particle to provide flowability to the particle, when the organic substance-attached particle is transported through a pipe, the oil on the surface of the particle transfers to the inner wall of the pipe over time, thereby decreasing the amount of oil on the surface of the particle. Thus, the flowability conferred by the oil decreases.

On the other hand, the organic substance-attached particle according to the present exemplary embodiment satisfies inequality (1), $(Cf-Ce)/2>1$, $Cf$ being the amount of carbon (atom %) measured by subjecting the surface of the organic substance-attached particle to X-ray photoelectron spectroscopy (XPS) after the organic substance-attached particle is washed, $Ce$ being the amount of carbon (atom %) measured by subjecting the surface of the organic substance-attached particle to X-ray photoelectron spectroscopy (XPS) after the particle is washed and subjected to two-minute surface etching.

When inequality (1) is satisfied, the organic substance is present on the surface of the organic substance-attached particle and also deep inside the pores after the organic substance on the surface is removed by washing.

In other words, in the organic substance-attached particle, which satisfies inequality (1), when the organic substance transfers from the particle surface, the organic substance migrates from the pores of the particle. Thus, the amount of organic substance on the surface of the particle is likely to be maintained.

Therefore, the organic substance-attached particle according to the present exemplary embodiment has excellent sustainability of the function of the organic substance.

To treat the inside of the pores with silicone oil, a technique of surface treatment of sol-gel silica particles with silicone oil in supercritical carbon dioxide is known; however, it is required that sustainability of the function be further improved.

The organic substance-attached particle according to the present exemplary embodiment has more excellent sustainability of the function of the organic substance than a surface-treated silica particle treated by using such a technique.

Hereinafter, the organic substance-attached particle according to the present exemplary embodiment will be fully described.

Organic Substance-Attached Particle

The organic substance-attached particle according to the present exemplary embodiment satisfies the following inequality (1), $Cf$ being the amount of carbon (atom %) measured by subjecting the surface of the particle to X-ray photoelectron spectroscopy (XPS) after the particle is washed, $Ce$ being the amount of carbon (atom %) measured by subjecting the surface of the particle to X-ray photoelectron spectroscopy (XPS) after two-minute surface etching of the particle. To improve sustainability of the function of the organic substance, the following inequality (12) is preferably satisfied, and the following inequality (13) is more preferably satisfied.

$(Cf-Ce)/2>1$        inequality (1):

$(Cf-Ce)/2≥1.3$        inequality (12):

$(Cf-Ce)/2≥1.5$        inequality (13):

To suppress aggregation of the particles, the amount of carbon $Cf$ (atom %) and the amount of carbon $Ce$ (atom %) preferably satisfy $3≥(Cf-Ce)/2$.

The amount of carbon $Cf$ is measured by subjecting the surface of the organic substance-attached particle to X-ray photoelectron spectroscopy (XPS) after the organic substance-attached particle is washed.

Washing is performed as follows.

The organic substance-attached particles are mixed with tetrahydrofuran (THF) (solid content 10%) and subjected to dispersion treatment with an ultrasonic disperser at 50 Hz for an hour. Thereafter, the mixture is centrifuged with a centrifuge, and the supernatant is removed to obtain organic substance-attached particles washed.

The amount of carbon $Ce$ is measured by subjecting the surface of the organic substance-attached particle to X-ray photoelectron spectroscopy (XPS) after the organic substance-attached particle is washed and subjected to two-minute surface etching.

Surface etching is performed as follows.

Etching is performed for two minutes by an argon monomer etching method using argon as the etching gas. "VG ESCALAB-220i" is used as the etching apparatus. The conditions include an acceleration voltage of 2 kV, an emission current of 20 mA, and a cluster size of 2×2.

The measurement of the amount of carbon $Cf$ and the amount of carbon $Ce$ by X-ray photoelectron spectroscopy (XPS) is as follows.

The measurement is performed by using "VG ESCALAB-220i" as the XPS measuring apparatus. The X-ray source is monochromatic AlKα radiation. Acceleration voltage is set to 10 kV, and emission current is set to 20 mV. Specifically, the analysis region is set to 1 mmφ, and the detection depth is set to 5 nm. Based on the C1s spectrum measured, the number of carbon atoms is determined, and the amount of carbon relative to the total amount of atoms in the measurement region is calculated.

To improve sustainability of the function of the organic substance, the organic substance-attached particles preferably have a number average particle diameter of 7 nm or more and 150 nm or less, more preferably 7 nm or more and 100 nm or less, still more preferably 7 nm or more and 60 nm or less, still more preferably 10 nm or more and 60 nm or less, and most preferably 10 nm or more and 40 nm or less.

The number average particle diameter of the organic substance-attached particles is measured in the same manner as that of the porous inorganic oxide particles.

Porous Inorganic Oxide Particle

The porous inorganic oxide particle is a particle to which the organic substance is attached.

The porous inorganic oxide particle may be a silica, alumina, titanium oxide, barium titanate, magnesium titanate, calcium titanate, strontium titanate, copper oxide, zinc oxide, tin oxide, silica sand, clay, mica, wollastonite, diatom earth, chromium oxide, cerium oxide, colcothar, antimony trioxide, magnesium oxide, zirconium oxide, barium sulfate, barium carbonate, calcium carbonate, silicon carbide, or silicon nitride particle. A mixture of such particles or a composite particle may be used as the porous inorganic oxide particle.

Among such particles, to control the number average particle diameter and the particle size distribution, the porous inorganic oxide particle is preferably a silica, titania, or alumina particle and more preferably a silica particle.

The silica particle mainly contains silica, in other words, $SiO_2$ and may be a crystalline or amorphous particle.

The silica particle may be produced from a silicon compound, such as liquid glass or alkoxysilane, or may be obtained by pulverizing quartz.

Specifically, the silica particle may be a sol-gel silica particle, an aqueous colloidal silica particle, an alcoholic silica particle, a gas-phase method silica particle (i.e., fumed silica particle), or a molten silica particle. Among such particles, a gas-phase method silica particle is appropriate.

A gas-phase method silica particle has particularly small pores and tends to have a low sustainability of the function of the organic substance. However, when a gas-phase method silica particle satisfies inequality (1), the gas-phase process particle used as the organic substance-attached particle has excellent sustainability of the function of the organic substance.

To improve sustainability of the function of the organic substance, the porous inorganic oxide particles preferably have a number average particle diameter within the range of 7 nm to 150 nm, more preferably 7 nm to 100 nm, still more preferably 7 nm to 60 nm, still more preferably 10 nm to 60 nm, and most preferably 10 nm to 40 nm.

The number average particle diameter of the porous inorganic oxide particles is measured as follows.

The porous inorganic oxide particles are observed under a scanning microscope. Image analysis of the porous inorganic oxide particles is performed to measure the number average particle diameter. Specifically, the porous inorganic oxide particles are observed under a scanning microscope. Images analysis of the porous inorganic oxide particles is performed to measure the equivalent sphere diameter of the porous inorganic oxide particles. The equivalent sphere diameter of 100 porous inorganic oxide particles is measured. The 50% diameter (D50p) in the number-based cumulative distribution of the obtained equivalent sphere diameters is defined as the number average particle diameter of the porous inorganic oxide particles.

Organic Substance

The organic substance is a surface treatment agent used to improve characteristics, such as the flowability of the porous inorganic oxide particles and the aggregating property of the particles during compression.

Typical example of the organic substance is oil. Examples of the organic substance include fluorinated oil and paraffinic oil.

One or more compounds selected from a group consisting of lubricant oil and grease are used as the oil. Specific examples of the oil include silicone oil, paraffin oil, fluorinated oil, and vegetable oil. Such oil may be used alone or in a combination of two types or more.

Examples of the silicone oil include dimethyl silicone oil, methylphenyl silicone oil, chlorophenyl silicone oil, methylhydrogen silicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, acryl-modified silicone oil, methacryl-modified silicone oil, and methylstyrene-modified silicone oil. The paraffin oil may be liquid paraffin. The fluorinated oil may be fluorinated oil or fluorinated chlorine oil.

The mineral oil may be machine oil.

The vegetable oil may be rapeseed oil or palm oil.

Among such oil, unreactive silicone oil is preferable. When unreactive silicone oil is used, the oil readily reaches a portion deep inside of pores of the porous inorganic oxide particle regardless of the size of the pores, thereby improving the function of the organic substance (silicone oil) (e.g., improvement in flowability).

Here, the unreactive silicone oil refers to silicone oil having a functional group that does not react with a functional group of the porous inorganic oxide. A functional group that does not react with a functional group of the porous inorganic oxide is preferably a functional group that does not react with a substance that is to be in contact with the silicone oil, in other words, a functional group that does not react with a component of a composition to be added to the organic substance-attached particle.

To improve sustainability of the function of the organic substance, the oil preferably has a viscosity (25° C.) of 1 cSt or higher and 1000 cSt or lower, more preferably 10 cSt or higher and 500 cSt or lower, and still more preferably 50 cSt or higher and 300 cSt or lower.

The viscosity of the oil is measured as follows.

To 100 g of toluene, 1 g of the organic substance-attached particles is added and dispersed by using an ultrasonic disperser at 100 Hz for 30 minutes. Thereafter, the supernatant is collected. Next, the concentration of the oil in the supernatant is adjusted to be 1 g/100 mL to obtain an oil-containing toluene solution. The specific viscosity $[\eta_{sp}]$ (25° C.) of the solution is determined from the following formula (A).

$$\eta_{sp}=(\eta/\eta_0)-1 \qquad \text{formula (A):}$$

($\eta_0$: viscosity of toluene; $\eta$: viscosity of solution)

Next, the specific viscosity $[\eta_{sp}]$ is substituted into Huggins formula represented by the following formula (B) to determine the intrinsic viscosity $[\eta]$.

$$\eta_{sp}=[\eta]+K'[\eta]^2 \qquad \text{formula (B):}$$

(K': Huggins' constant; K'=0.3 (when $[\eta]$=1 to 3 is satisfied))

Next, the intrinsic viscosity $[\eta]$ is substituted into the A. Kolorlov's formula represented by the following formula (C) to determine the molecular weight M.

$$[\eta]=0.215\times10^{-4}M^{0.65} \qquad \text{formula (C):}$$

The molecular weight M is substituted into the A. J. Barry's formula represented by the following formula (D) to determine the oil viscosity $[\eta]$.

$$\log \eta=1.00+0.0123M^{0.5} \qquad \text{formula (D):}$$

To improve sustainability of the function of the organic substance, the amount of organic substance attached relative to the porous inorganic oxide particle after washing is preferably 4 mass % or higher, more preferably 4.5 mass % or higher, and still more preferably 5 mass % or higher.

To suppress aggregation of the particles, the upper limit of the amount of organic substance attached relative to the porous inorganic oxide particle after washing is preferably 7 mass % or lower and more preferably 6 mass % or lower.

The amount of organic substance attached relative to the porous inorganic oxide particle after washing refers to the amount of organic substance attached relative to the porous inorganic oxide particle, which is measured in accordance with the above-described method after the organic substance-attached particle is washed.

The amount of organic substance attached is measured as follows.

After being washed, the organic substance-attached particles are fired in a nitrogen atmosphere at 700° C. for an hour. The amount is determined from the difference in weight before and after firing. In other words, when the weight before firing is denoted as Wb and the weight after firing is denoted as Wa, the amount of organic substance attached is calculated from the following equation.

amount of organic substance attached=$(Wb-Wa)/Wb\times100$

Method for Producing Organic Substance-Attached Porous Inorganic Oxide Particle

An exemplary method for producing the organic substance-attached particle according to the present exemplary embodiment is as follows.

First, porous inorganic oxide particles are dispersed and an organic substance is dissolved in a dispersion medium to prepare a dispersion liquid.

Next, untreated silica particles are put into the dispersion liquid placed in a seal reaction vessel.

Then, while supercritical carbon dioxide flows in the seal reaction vessel (i.e., supercritical carbon dioxide is introduced into the seal reaction vessel and discharged from the vessel), the dispersion medium is discharged from the seal reaction vessel with supercritical carbon dioxide to dry the porous inorganic oxide particles.

According to the above steps, the surface treatment of the porous inorganic oxide particles with the organic substance is performed, and the organic substance-attached particles according to the present exemplary embodiment are obtained.

Application of Organic Substance-Attached Particle

The organic substance-attached particle according to the present exemplary embodiment may be used as a main component or an additive of toner, cosmetics, rubber, and abrasives.

EXAMPLES

Hereinafter, the exemplary embodiment will be specifically described in detail with reference to Examples and Comparative Examples. The exemplary embodiment is not limited to such Examples. The unit "part" refers to "part by mass", unless stated otherwise.

Example 1

As described below, silica particles are subjected to surface treatment with oil. In the surface treatment, a device provided with a carbon dioxide cylinder, a carbon dioxide pump, an entrainer pump, an autoclave with a stirrer (capacity 500 ml), and a pressure valve is used.

In 80 parts of methanol used as the dispersion medium, 20 parts of fumed silica particles (product name OX50, manufactured by NIPPON AEROSIL CO., LTD.) are dispersed as the porous inorganic oxide particles and 2 parts of dimethyl silicone oil (KF-96-100cs, Shin-Etsu Chemical Co., Ltd.) is dissolved as the organic substance.

Into the autoclave with a stirrer (capacity 500 ml), 300 parts of the dispersion liquid is poured. Then, the liquid is stirred at 100 rpm by using a stirrer. Thereafter, liquefied carbon dioxide is introduced into the autoclave. The pressure is increased by a carbon dioxide pump while heating is performed by using a heater, to bring the carbon oxide into a supercritical state at 150° C. and 15 MPa in the autoclave. While the pressure in the autoclave is maintained at 15 MPa with a pressure valve, critical carbon dioxide flows by means of the carbon oxide pump to remove the dispersion medium from the dispersion liquid.

From the above operations, organic substance-attached particles (S1), which are surface-treated with the organic substance, in other words, to which the organic substance is attached, are obtained.

Examples 2 to 12

Organic substance-attached particles (S2) to (S3), which are surface-treated with an organic substance, in other words, to which an organic substance is attached, are obtained in the same manner as those in Example 1, except that the type and amount of porous inorganic oxide particles, dispersion medium, and organic substance are changed in accordance with Table 1.

Comparative Example 1

Organic substance-attached particles (SC1), which are surface-treated with an organic substance, in other words, to which an organic substance is attached, are obtained in the same manner as those in Example 1, except that 20 parts of fumed silica particles (OX50, manufactured by NIPPON AEROSIL CO., LTD.) as the porous inorganic oxide particles and 2 parts of dimethyl silicone oil (KF-96-100cs, Shin-Etsu Chemical Co., Ltd.) as the organic substance are placed without using a dispersion medium in an autoclave with a stirrer (capacity 500 ml).

Comparative Examples 2, 5, and 6

Organic substance-attached particles (SC2), (SC5), and (SC6), which are surface-treated with an organic substance, in other words, to which an organic substance is attached, are obtained in the same manner as those in Example 1, except that the type and amount of porous inorganic oxide particles, dispersion medium, organic substance are changed in accordance with Table 1.

In production of the organic substance-attached particles (SC5), air flows to remove the dispersion medium from the dispersion liquid.

Comparative Example 3

Silica particles that have been treated with dimethyl silicone oil, (product name "NY50", manufactured by NIPPON AEROSIL CO., LTD.), are prepared as the organic substance-attached particles (SC2).

Comparative Example 4

Silica particles treated with dimethyl silicone oil, (product name "RY50", manufactured by NIPPON AEROSIL CO., LTD.), are prepared as the organic substance-attached particles (SC3).

Evaluation of Characteristics

The following characteristics of the organic substance-attached particles in each example are measured by the above-described methods.

the number average particle diameter of porous inorganic oxide particles ($D50p$)

the pore size of porous inorganic oxide particle (PS)

the number average particle diameter of organic substance-attached particles ($D50p$)

the pore size of organic substance-attached particle (PS)

the amount of carbon (atom %) measured by subjecting the surface of the organic substance-attached particle to XPS after the particle is washed (Cf)

the amount of carbon (atom %) measured by subjecting the surface of the organic substance-attached particle to XPS after two-minute surface etching of the particle (Ce)

value of (Cf−Ce)/2 the amount of organic substance attached relative to the porous inorganic oxide particle after washing (initial value in Tables)

Evaluation
Change in Characteristics Before and After Particles Pass Through Pipe A test pipe made of SUS304 that has an inner diameter of 47.8 mm and a length of 10 m and that includes an R90° elbow portion positioned 5 m from the inlet is prepared. A powder suction test is performed such that resin particles are transported through a filter by air from the outlet of the test pipe by using a blower. In the test, the operation of transporting 30 kg of the resin particles by air at a linear velocity of 5.0 m/min in the pipe and at a solid-air ratio of 0.5 is repeated five times.

Then, after the porous inorganic oxide particles are transported through the pipe, the amount of organic substance attached relative to the porous inorganic oxide particle and the degree of compression and aggregation are determined and evaluated in accordance with the following evaluation criteria.

Amount of Organic Substance Attached Relative to Porous Inorganic Oxide Particle The difference between the amount of organic substance after the particles are transported in the pipe (terminal value in Table) and the amount of organic substance before the particles are transported (initial value in Table) (initial value−terminal value/initial value×100) is calculated, and evaluated in accordance with the following evaluation criteria.

A (E): lower than 3%
B (G): 3% or higher and lower than 5%
C (F): 5% or higher and lower than 10%
D (P): 10% or higher Compression Aggregation Degree The compression aggregation degree of the organic substance-attached particles after the particles are transported through the pipe is determined and evaluated in accordance with the following evaluation criteria.

A (E): 94% or higher
B (G): 90% or higher and lower than 94%
C (F): 85% or higher and lower than 90%
D (P): lower than 85%

The compression aggregation degree is calculated by the following method.

A disk shape mold of 6 cm diameter is filled with 6.0 g of the organic substance-attached particles. Next, the mold is compressed at a pressure of 2.0 t/cm$^2$ for 60 seconds by using a compression molding machine (manufactured by MAEKAWA TESTING MACHINE MFG. Co., Ltd.) to obtain a disk-shape compressed molded article of the organic substance-attached particles (hereinafter, referred to as "molded article before dropping"). Thereafter, the mass of the molded article before dropping is measured.

Next, the molded article before dropping is placed on a sieve of 600 μm mesh size and dropped at a frequency of 95 Hz and an amplitude of 1 mm by using a vibration sieve machine (product number VIBRATING MVB-1 manufactured by TSUTSUI SCIENTIFIC INSTRUMENTS CO., LTD.). The organic substance-attached particles fall from the molded article before dropping through the sieve, and the molded article of the organic substance-attached particles remains on the sieve, accordingly. Thereafter, the mass of the molded article of the organic substance-attached particles, which remains on the sieve, (referred to as "the molded article after dropping) is measured.

Then, the compression aggregation degree is calculated from the following equation using the ratio of the mass of the molded article after dropping to the mass of the molded article before dropping.

equation: compression aggregation degree=(mass of molded article after dropping/mass of molded article before dropping)×100

The abbreviations in Table are as follows.
DSO: dimethyl silicone oil
DEMNUM: fluorinated oil (DEMNUM S-20 (manufactured by DAIKIN INDUSTRIES, LTD))
HS Trans N: paraffinic electric insulating oil (HS trans N (manufactured by JXTG Nippon Oil & Energy Corporation))

TABLE 1

| Organic substance-attached particle | Porous inorganic oxide particle | | Dispersion medium | | Organic substance | | |
|---|---|---|---|---|---|---|---|
| | Type | Particle diameter D50 p (nm) | Number of parts (part) | Type | Number of parts (part) | Type | Viscosity (cSt) | Number of parts (part) |
| (S1) | fumed silica | 40 | 20 | methanol | 80 | DSO | 100 | 2 |
| (S2) | fumed silica | 40 | 20 | ethanol | 80 | DSO | 100 | 2 |
| (S3) | fumed silica | 40 | 20 | acetone | 80 | DSO | 100 | 2 |
| (S4) | fumed silica | 60 | 20 | methanol | 80 | DSO | 1000 | 2 |
| (S5) | fumed silica | 7 | 10 | acetone | 90 | DSO | 1 | 1 |
| (S6) | fumed silica | 40 | 20 | methanol | 80 | DSO | 100 | 3 |
| (S7) | fumed silica | 40 | 20 | methanol | 80 | DSO | 500 | 3 |
| (S8) | fumed silica | 40 | 10 | ethanol | 90 | DEMNUM | 55 | 1 |
| (S9) | fumed silica | 40 | 10 | acetone | 90 | HS trans N | 10 | 1 |
| (S10) | sol-gel silica | 80 | 20 | methanol | 80 | DSO | 100 | 2 |
| (S11) | sol-gel silica | 50 | 20 | methanol | 80 | DSO | 100 | 2 |
| (S12) | sol-gel silica | 150 | 20 | methanol | 80 | DSO | 100 | 2 |
| (SC1) | fumed silica | 40 | 20 | none | — | DSO | 100 | 2 |
| (SC2) | sol-gel silica | 170 | 20 | methanol | 80 | DSO | 100 | 2 |
| (SC3) | RY50 | — | — | — | — | — | — | — |
| (SC4) | NY50 | — | — | — | — | — | — | — |
| (SC5) | fumed silica | 40 | 20 | none | — | DSO | 100 | 2 |
| (SC6) | fumed silica | 40 | 20 | none | — | DSO | 100 | 3 |

TABLE 1-continued

Characteristics of organic substance-attached particles

| Organic substance-attached particle | Atmosphere for treatment | Particle diameter D50 p (nm) | Amount of organic substance attached (initial value) (mass %) | Amount of carbon Cf (atom %) | Amount of carbon Ce (atom %) | (Cf—Ce)/2 |
|---|---|---|---|---|---|---|
| (S1) | supercritical $CO_2$ | 40 | 5 | 15.0 | 11.5 | 1.75 |
| (S2) | supercritical $CO_2$ | 40 | 4.8 | 14.8 | 11.0 | 1.9 |
| (S3) | supercritical $CO_2$ | 40 | 4.4 | 14.2 | 9.8 | 2.2 |
| (S4) | supercritical $CO_2$ | 60 | 4.8 | 14.7 | 11.4 | 1.65 |
| (S5) | supercritical $CO_2$ | 7 | 3.1 | 10.1 | 7.9 | 1.1 |
| (S6) | supercritical $CO_2$ | 40 | 7.8 | 18.7 | 13.4 | 2.65 |
| (S7) | supercritical $CO_2$ | 40 | 7.8 | 19.0 | 13.9 | 2.55 |
| (S8) | supercritical $CO_2$ | 40 | 3.6 | 12.0 | 9.6 | 1.2 |
| (S9) | supercritical $CO_2$ | 40 | 3.2 | 10.5 | 8.0 | 1.25 |
| (S10) | supercritical $CO_2$ | 80 | 4.8 | 14.7 | 11.2 | 1.75 |
| (S11) | supercritical $CO_2$ | 50 | 4.9 | 15.1 | 12.1 | 1.5 |
| (S12) | supercritical $CO_2$ | 150 | 4.5 | 14.3 | 10.0 | 2.15 |
| (SC1) | supercritical $CO_2$ | 40 | 2.1 | 7.2 | 6.2 | 05 |
| (SC2) | supercritical $CO_2$ | 170 | 3.5 | 11.7 | 10 | 0.85 |
| (SC3) | — | 40 | 4.5 | 14.1 | 13.5 | 03 |
| (SC4) | — | 30 | 3 | 10.0 | 9.8 | 0.1 |
| (SC5) | air | 40 | 2.3 | 7.8 | 7.3 | 0.25 |
| (SC6) | supercritical $CO_2$ | 40 | 3.2 | 10.4 | 9.2 | 06 |

TABLE 2

| | Organic substance-attached particle | Amount of organic substance attached (mass %) | | Difference (initial value − terminal value)/initial value × 100 | Compression aggregation degree | |
|---|---|---|---|---|---|---|
| | | Initial value | Terminal value | | | |
| Example 1 | (S1) | 5 | 5 | 0% | A(E) | A(E) |
| Example 2 | (S2) | 4.8 | 4.8 | 0% | A(E) | A(E) |
| Example 3 | (S3) | 4.4 | 4.3 | 2% | A(E) | A(E) |
| Example 4 | (S4) | 4.8 | 4.8 | 0% | A(E) | A(E) |
| Example 5 | (S5) | 3.1 | 2.9 | 6% | B(G) | A(E) |
| Example 6 | (S6) | 7.8 | 7.6 | 3% | A(E) | A(E) |
| Example 7 | (S7) | 7.8 | 7.7 | 1% | A(E) | A(E) |
| Example 8 | (S8) | 3.6 | 3.5 | 3% | A(E) | A(E) |
| Example 9 | (S9) | 3.2 | 3.1 | 3% | A(E) | B(G) |
| Example 10 | (S10) | 4.8 | 4.8 | 0% | A(E) | A(E) |
| Example 11 | (S11) | 4.9 | 4.8 | 2% | A(E) | A(E) |
| Example 12 | (S12) | 4.5 | 4.4 | 2% | A(E) | B(G) |
| Comparative Example 1 | (SC1) | 2.1 | 1.9 | 10% | C(F) | C(F) |
| Comparative Example 2 | (SC2) | 3.5 | 3.1 | 11% | C(F) | C(F) |
| Comparative Example 3 | (SC3) | 4.5 | 4 | 11% | D(P) | C(F) |
| Comparative Example 4 | (SC4) | 3 | 2.6 | 13% | D(P) | C(F) |
| Comparative Example 5 | (SC5) | 2.3 | 1.9 | 17% | D(P) | D(P) |
| Comparative Example 6 | (SC6) | 3.2 | 2.8 | 13% | C(F) | C(F) |

From the above results, it has been found that the organic substance-attached particle according to the present exemplary embodiment has a small difference in the amount of organic substance before and after the particle is transported in the pipe and has an excellent compression aggregation degree after the particle is transported in the pipe.

This shows that the organic substance-attached particle according to the present exemplary embodiment has excellent sustainability of the function of the organic substance.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An organic substance-attached porous inorganic oxide particle comprising:
   a porous inorganic oxide particle; and
   an organic substance attached to a surface of the porous inorganic oxide particle,
   wherein the organic substance-attached porous inorganic oxide particle satisfies a formula below $(Cf-Ce)/2>1$ where Cf represents the amount of carbon (atom %) measured by subjecting the surface of the particle to X-ray photoelectron spectroscopy (XPS) after the organic substance-attached porous inorganic oxide particle is washed, and Ce represents the amount of carbon (atom %) measured by subjecting the surface of the washed organic substance-attached porous inorganic oxide particle to X-ray photoelectron spectroscopy (XPS) after two-minute surface etching of the particle,
   wherein the organic substance-attached porous inorganic oxide particle is washed by mixing the organic substance-attached porous inorganic oxide particle with tetrahydrofuran (THF) to form a mixture, subjecting the mixture to a dispersion treatment, and centrifuging the mixture, followed by removing a supernatant to obtain the washed organic substance-attached porous inorganic oxide particle, and
   the washed organic substance-attached porous inorganic oxide particle is surface etched for two minutes by an argon monomer etching method using argon as an etching gas.

2. The organic substance-attached porous inorganic oxide particle according to claim 1, wherein the organic substance-attached porous inorganic oxide particle satisfies a formula below:

$(Cf-Ce)/2 \geq 1.5$.

3. The organic substance-attached porous inorganic oxide particle according to claim 1, wherein the porous inorganic oxide particles have a number average particle diameter within a range of 7 nm to 150 nm.

4. The organic substance-attached porous inorganic oxide particle according to claim 1, wherein the porous inorganic oxide particles have a number average particle diameter within a range of 7 nm to 60 nm.

5. The organic substance-attached porous inorganic oxide particle according to claim 1, wherein the porous inorganic oxide particle is a gas-phase method silica particle.

6. The organic substance-attached porous inorganic oxide particle according to claim 1, wherein the organic substance is oil.

7. The organic substance-attached porous inorganic oxide particle according to claim 6, wherein the oil is unreactive silicone oil.

8. The organic substance-attached porous inorganic oxide particle according to claim 1, wherein an amount of the organic substance attached relative to the porous inorganic oxide particle after washing is 4 mass % or higher and 8 mass % or lower.

9. The organic substance-attached porous inorganic oxide particle according to claim 1, wherein an amount of the organic substance attached relative to the porous inorganic oxide particle after washing is 3 mass % or higher and 6 mass % or lower.

* * * * *